US007240081B1

(12) United States Patent
Okayasu et al.

(10) Patent No.: US 7,240,081 B1
(45) Date of Patent: Jul. 3, 2007

(54) FREE STORAGE SPACE MANAGEMENT APPARATUS AND METHOD

(75) Inventors: Gentaro Okayasu, Kanagawa (JP); Shintaro Mizutani, Kanagawa (JP); Tsutomu Yamamoto, Tokyo (JP); Taro Shigata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/492,044

(22) Filed: Jan. 26, 2000

(30) Foreign Application Priority Data

Jan. 28, 1999 (JP) ................................. 11-020334

(51) Int. Cl.
G06F 17/30 (2006.01)
G06F 17/00 (2006.01)

(52) U.S. Cl. ...................................... 707/205; 707/101
(58) Field of Classification Search ........ 707/200–206, 707/100–103; 711/100, 147
See application file for complete search history.

(56) References Cited

U.S. PATENT DOCUMENTS

| 5,440,737 | A | * | 8/1995 | Uchinuma ................... 707/205 |
| 5,841,740 | A | * | 11/1998 | Fijita et al. .................. 386/126 |
| 6,032,216 | A | * | 2/2000 | Schmuck et al. ............ 710/200 |
| 6,505,217 | B1 | * | 1/2003 | Venkatraman et al. ....... 707/205 |
| 6,574,667 | B1 | * | 6/2003 | Blumenau et al. ........... 709/229 |

* cited by examiner

*Primary Examiner*—Joon Hwan Hwang
(74) *Attorney, Agent, or Firm*—Frommer Lawrence & Haug LLP; William S. Frommer; Thomas F. Presson

(57) ABSTRACT

An apparatus to be controlled has a storage and information relating to the free storage space of the storage. A control apparatus for recording information in the storage of the apparatus to be controlled by controlling the apparatus to be controlled acquires the information relating to the free storage space of the storage.

8 Claims, 15 Drawing Sheets

FREE STORAGE SPACE MANAGEMENT INFORMATION

FREE STORAGE SPACE MANAGEMENT APPARATUS AND METHOD

BACKGROUND OF THE INVENTION

1. Field of the Invention

The present invention relates to free storage space management in a broadcasting apparatus. For example, the invention relates to a free storage space management apparatus and method in a broadcasting apparatus which can correctly manage the free storage space of a recording means and makes it possible to continue the control by selecting another usable broadcasting apparatus at the time of a control failure in a case where a plurality of users perform manipulations by simultaneously using plural pieces of broadcasting equipment with a control apparatus provided with a function of synchronizing free storage space values and a function of retrying recording area securing.

2. Description of the Related Art

A broadcasting business AV (audio-visual) server system (also called a video input/output apparatus or a video recording/reproducing apparatus) will be described below as an example of broadcasting apparatuses. Such a system is operated with an assumption that it is simultaneously used by a plurality of users with the use of a plurality of terminals.

Further, such a system is designed with an assumption that it will be used for direct broadcast of commercial messages and news programs. Therefore, to prevent a broadcast accident, such an apparatus is required to have a function of continuing the control by using anther usable apparatus even at the occurrence of a failure in an equipment control.

FIG. 1 shows a conventional broadcasting apparatus. A control apparatus 1000 controls an apparatus 1002 to be controlled through a control 1001 (control command). The apparatus 1002 to be controlled has a storage 1003 as a recording means. This conventional system is designed with an assumption that the free storage space of the storage 1003 of the apparatus 1002 to be controlled decreases when it receives a control 1001 of the control apparatus 1000.

However, there is a case that the free storage space of the storage 1003 of the apparatus 1002 to be controlled decreases asynchronously with the control 1001 of the higher-rank control apparatus 1000. For example, the free storage space of the storage 1003 of the apparatus 1002 to be controlled decreases when another control apparatus 1004 uses (indicated by numeral 1005) the free storage space of the storage 1003.

This causes discrepancy between free storage space information held by the control apparatus 1000 and that held by the apparatus 1002 to be controlled. That is, the actual free storage space of the storage 1003 is smaller than the free storage space of the storage 1003 that is recognized by the control apparatus 1000. As a result, there may occur a phenomenon that the control apparatus 1000 fails to secure a necessary recording area in the storage 1003 through a control 1001. In this case, the operation of the broadcasting apparatus is suspended.

SUMMARY OF THE INVENTION

The present invention has been made to solve the above problem in the art, and an object of the invention is therefore to provide a free storage space management apparatus and method in a broadcasting apparatus which can correctly manage the free storage space of a recording means and makes it possible to continue the control by selecting another usable recording means even in the case of a failure in securing a recording area in the free storage space of a recording means.

The invention provides a free storage space management apparatus in a broadcasting apparatus, comprising means to be controlled having recording means and information relating to free storage space of the recording means; and control means for recording information in the recording means of the means to be controlled by controlling the means to be controlled, and for acquiring the information relating to the free storage space of the recording means.

With this configuration, the control means can correctly acquire the information relating to the current free storage space of the recording means of the means to be controlled of the broadcasting apparatus, and hence can correctly manage the free storage space value of the recording means.

The control means may have management information relating to free storage space that is synchronized with the information relating to the free storage space of the recording means of the means to be controlled. By referring to the management information relating to free storage space, the control means can correctly manage the free storage space.

The free storage space management apparatus may be such that when discrepancy occurs between the information relating to the free storage space of the recording means of the means to be controlled and the management information relating to free storage space in the control means, the control means synchronizes the management information relating to free storage space in the control means with the information relating to the free storage space of the recording means of the means to be controlled. The discrepancy can be resolved in this manner.

The free storage space management apparatus may be such that the means to be controlled has a plurality of recording means, and that when an operation of securing a recording area in one of the plurality of recording means in response to a command from the control means has resulted in a failure, the control means secures a recording area in another of the plurality of recording means in accordance with a reason for the failure. With this measure, when a control fails, the control can be continued by selecting another usable recording means. Therefore, the operation can be prevented from being stopped.

According to another aspect of the invention, there is provided a free storage space management method in a broadcasting apparatus, wherein control means for recording information in recording means by controlling means to be controlled having information relating to free storage space of the recording means acquires the information relating to the free storage space of the recording means of the means to be controlled.

With this method, the control means can correctly acquire the information relating to the current free storage space of the recording means of the means to be controlled, and hence can correctly manage the free storage space of the recording means.

The control means may have management information relating to free storage space that is synchronized with the information relating to the free storage space of the recording means of the means to be controlled. By referring to the management information relating to free storage space, the control means can correctly manage the free storage space.

The free storage space management method may be such that when discrepancy occurs between the information relating to the free storage space of the recording means of the means to be controlled and the management information relating to free storage space in the control means, the control means synchronizes the management information relating to free storage space in the control means with the information relating to the free storage space of the recording means of the means to be controlled. The discrepancy can be resolved in this manner.

The free storage space management method may be such that the means to be controlled has a plurality of recording means, and that when an operation of securing a recording area in one of the plurality of recording means in response to a command from the control means has resulted in a failure, the control means secures a recording area in another of the plurality of recording means in accordance with a reason for the failure. With this measure, when a control fails, the control can be continued by selecting another usable recording means. Therefore, the operation can be prevented from being stopped.

The free storage space management method may be such that the means to be controlled further has second information relating to free storage space that is to be presented to the control means by the means to be controlled, and that when the control means tentatively secures an information recording area in the recording means of the means to be controlled, the control means temporarily secures a recording area requested by the control means in the second information relating to free storage space to but does not change a value of the information relating to the free storage space of the recording means.

With this measure, even if a command for securing a recording area in the free storage space of the recording means arrives from the outside, securing of a recording area in the free storage space of the recording means by the external control can be prevented because a recording area requested by the control means is already secured tentatively in the second information relating to free storage space.

The free storage space management method may be such that when there is a difference between the tentatively secured recording area of the recording means and a recording area that has been used actually by the control means, the control means synchronizes the second information relating to free storage space with the information relating to the free storage space of the recording means and secures the recording area of the recording means. With this measure, the information relating to the actual free storage space of the recording means can be displayed correctly and hence the control means can correctly recognize the actual free storage space of the recording means.

DETAILED DESCRIPTION OF THE PREFERRED EMBODIMENT

A preferred embodiment of the present invention will be hereinafter described in detail with reference to the accompanying drawings.

Since the embodiment described below includes various technically preferable limitations because it is a preferred embodiment of the invention. However, the scope of the invention is not limited to those limitative forms unless a statement to the effect that the invention is limited to a specific limitation is made in the following description.

Figure 1:
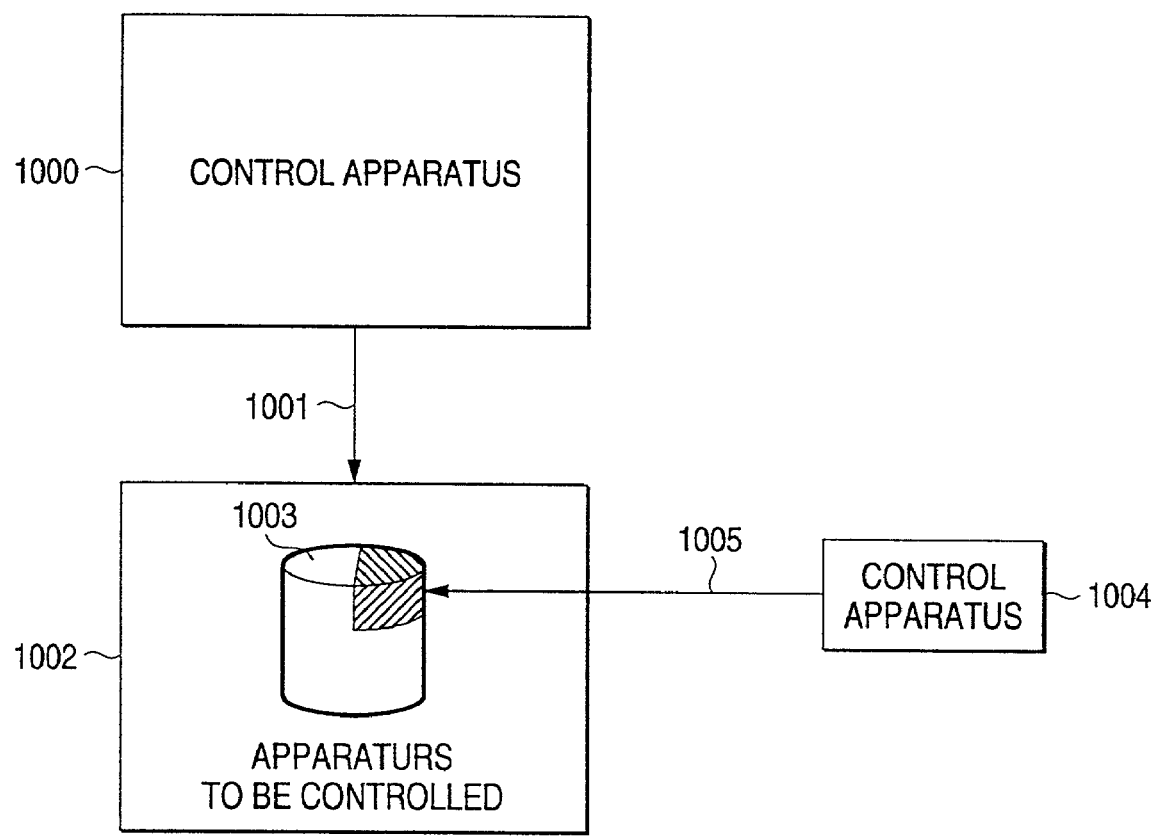
FIG. 1 shows a conventional free storage space management apparatus.
Figure 2:
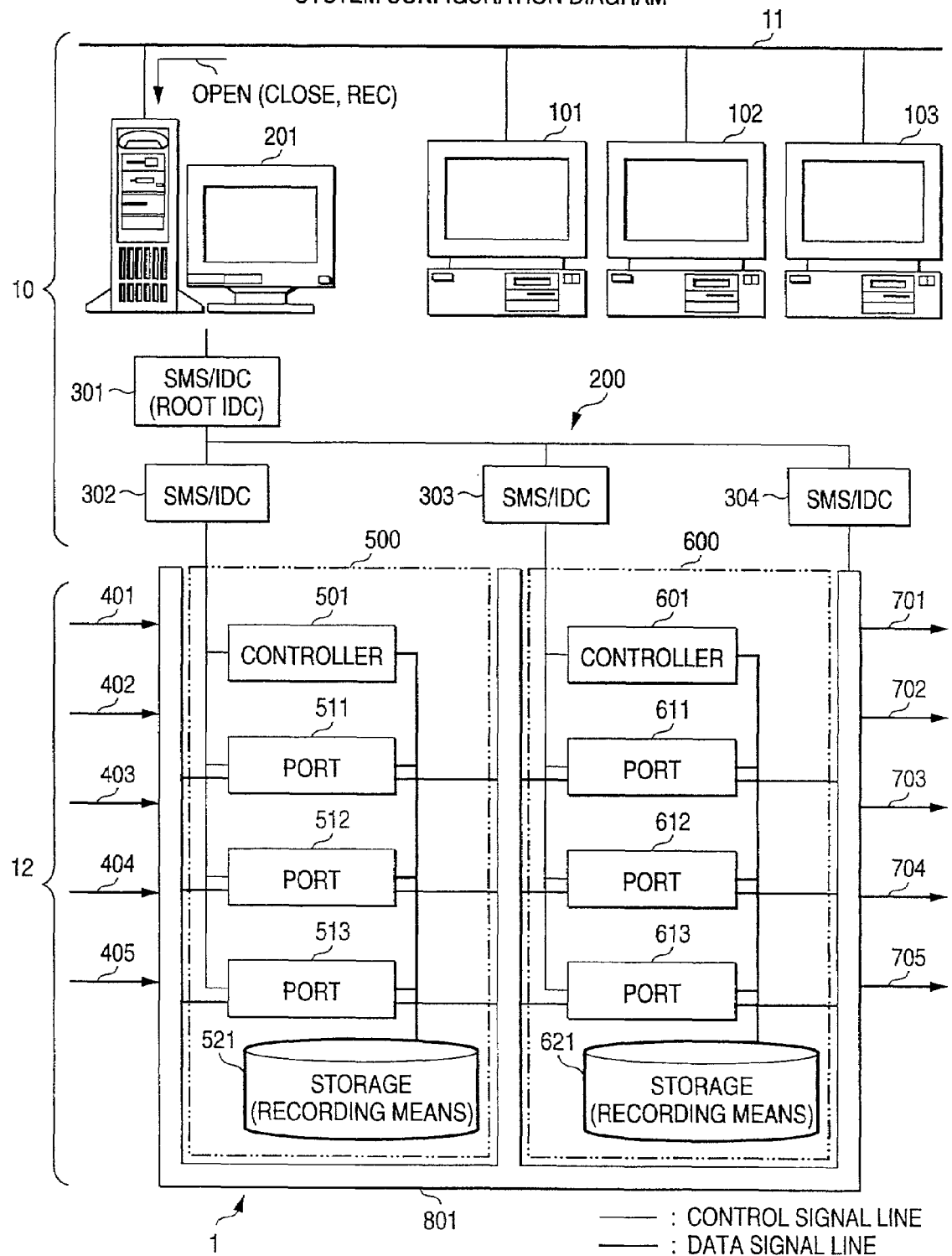
FIG. 2 shows a broadcasting apparatus that includes a free storage space management apparatus according to the invention.
Figure 3:
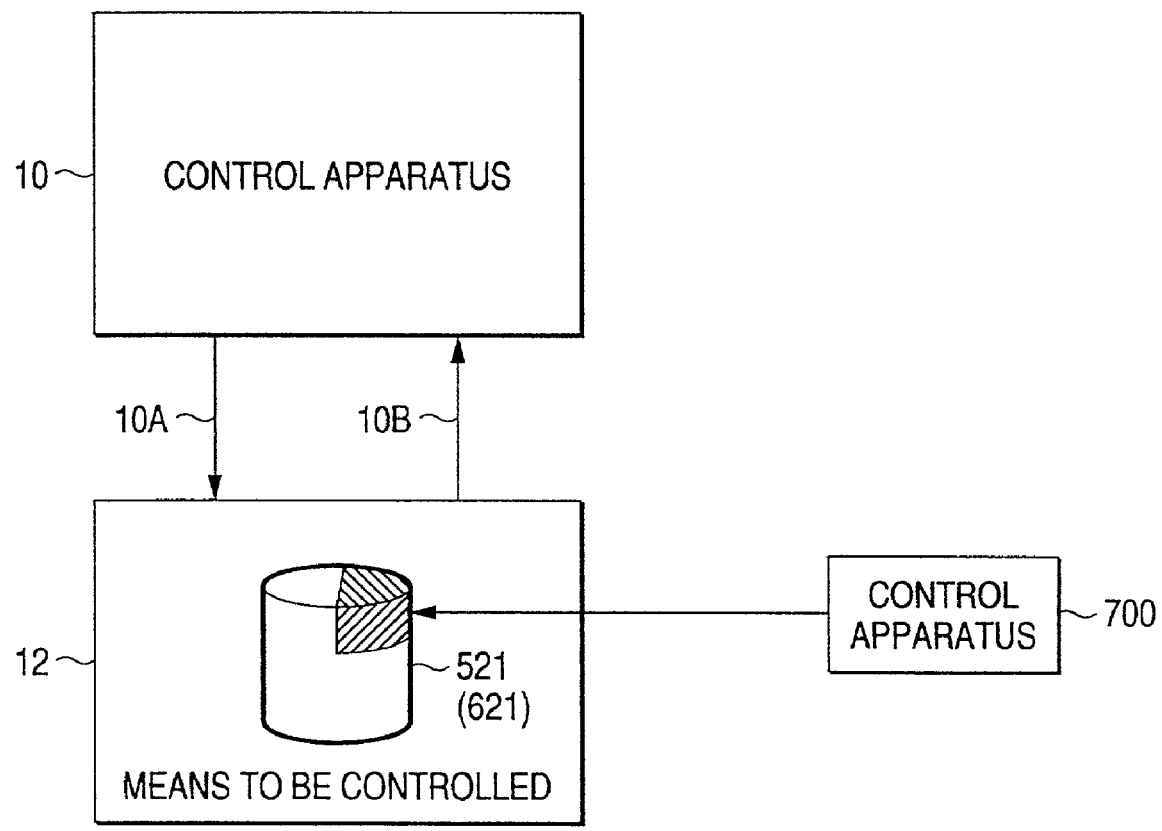
FIG. 3 shows a general configuration of the broadcasting apparatus of FIG. 2.

FIG. 2 shows an example broadcast apparatus 1 that includes a free storage space management apparatus according to the invention. FIG. 3 shows a general configuration of the broadcasting apparatus 1.

The broadcasting apparatus 1 is configured as shown in FIGS. 2 and 3. The broadcasting apparatus (system) 1 can transmit a video program while allowing a plurality of operators to record, edit, and view video materials simultaneously.

The broadcasting apparatus 1 can correctly manage the free storage space of a recording means and makes it possible to continue the control by selecting another usable recording means at the time of a control failure in a case where a plurality of users perform manipulations by simultaneously using plural pieces of broadcasting equipment, by providing a control apparatus with a function of synchronizing free storage space values and a function of retrying recording area securing.

As shown in FIGS. 2 and 3, the broadcasting apparatus 1 is generally consists of a control apparatus (control means) 10 and a means 12 to be controlled. The control apparatus 10 can perform a control 10A on the means 12 to be controlled, and can acquire information 10B about the free storage space values of a plurality of storages (recording means) 521, 621, etc. of the means 12 to be controlled. The storages 521, 621, etc. of the means 12 to be controlled can also be used by another, external control apparatus 700.

FIG. 2 shows a detailed configuration of the broadcasting apparatus 1. The control apparatus 10 has a plurality of higher-rank control terminals 101-103, an Ethernet 11, control apparatuses SMS/IDCs (server management system/intelligent device controllers) 301-304, and an equipment management/control apparatus SMS/GW (server management system/gateway) 201.

Although the three higher-rank control terminals 101-103 are shown in FIG. 2, the invention is not limited to such a case and, for example, two or four or more higher-rank control terminals may be provided. The higher-rank control terminals 101-103, which are used by users to manipulate various kinds of broadcasting equipment, are terminals for controlling such broadcasting equipment through GUI (graphical user interface) by activating applications suitable for uses such as editing, viewing, and program transmission of a material.

The Ethernet 11 is for communication between the higher-rank control terminals 101-103 and the SMS/GW 201.

The SMS/GW 201 is an apparatus for exclusively controlling various kinds of broadcasting equipment and managing video materials, and is a layer characteristic of this system. The SMS/GW 201 receives a control command from the higher-rank control terminals 101-103 and performs apparatus allocation and exclusion control. The SMS/GW 201 is an equipment management/control apparatus for allocating equipment to users.

The SMS/IDCs 301-304, which are control apparatuses for performing realtime control on various kinds of broadcasting equipment, are divided into one main IDC 301 and a plurality of sub-IDCs 302-304. Whereas the main IDC 301 performs command interpretation and realtime control, the sub-IDCs 302-304 are provided for respective kinds of broadcasting equipment.

As shown in FIG. 2, the means 12 to be controlled generally consists of input terminals 401-405, AV (audio-visual) servers (video recording/reproducing apparatuses or video input/output apparatuses) 500 and 600, and output terminals 701-705.

The input terminals 401-405 and the output terminals 701-705 are terminals for actual input and output, respectively, of video signals. The input terminals 401-405 are for input of video signals from within the system of FIG. 2 and the output terminals 701-705 are for output of video signals to the outside of the system. Equipment such as a VTR (video tape recorder) and a TV monitor (television monitor) can be connected to the input terminals 401-405 and the output terminals 701-705. The input terminals 401-405 and the output terminals 701-705 are connected to a router 801. The router 801 performs input/output switching on video signals.

The AV servers 500 and 600 have the same configuration. The AV server 500 has a controller 501, a plurality of ports 511-513, and a storage (recording means) 521. Similarly, the AV server 600 has a controller 601, a plurality of ports 611-613, and a storage (recording means) 621.

The controllers 501 and 601 are main computing devices in the AV servers 500 and 600, respectively. The ports 511-513 and 611-613 are video input/output computing devices in the AV servers 500 and 600, respectively. The storages 521 and 621, which are recording means and also called recording devices, store or record broadcast materials. The controllers 501 and 601 manage and control the ports 511-513 and 611-613 and the storages 521 and 621, respectively. The ports 511-513 and 611-613 perform manipulations on video materials and input/output of video signals.

In FIG. 2, thin lines represent control signal lines and thick lines represent data signal lines.

The broadcasting business AV servers 500 and 600 shown in FIG. 2 are required to simultaneously process a plurality of video signal recording requests that are issued from a plurality of clients.

As described above, in general, an AV server has a plurality of input/output ports for input/output of video signals and a storage for recording a video signal. When a plurality of recording operations are performed simultaneously, contention may occur about the input ports and the storage space of the storage. If no port can be assigned to a recording request from a client, recording itself cannot be performed. If the storage space of the storage is insufficient, a recording operation is stopped halfway.

Since a failure during a recording operation may cause a fatal trouble such as a lack of part of a broadcast material or a broadcast accident, a broadcasting business AV server is required to have a mechanism for ensuring a recording operation.

A free storage space management mechanism is for ensuring a correct recording operation by managing the storage space of a storage and a storage space consumption amount of the storage in each recording operation.

For example, the free storage space values of the storages 521 and 621 shown in FIG. 2 are managed by the SMS/GW 201. The SMS/GW 201 and the SMS/IDCs 301-304 in the control apparatus 10 constitute a server management system 200.

Figure 4:
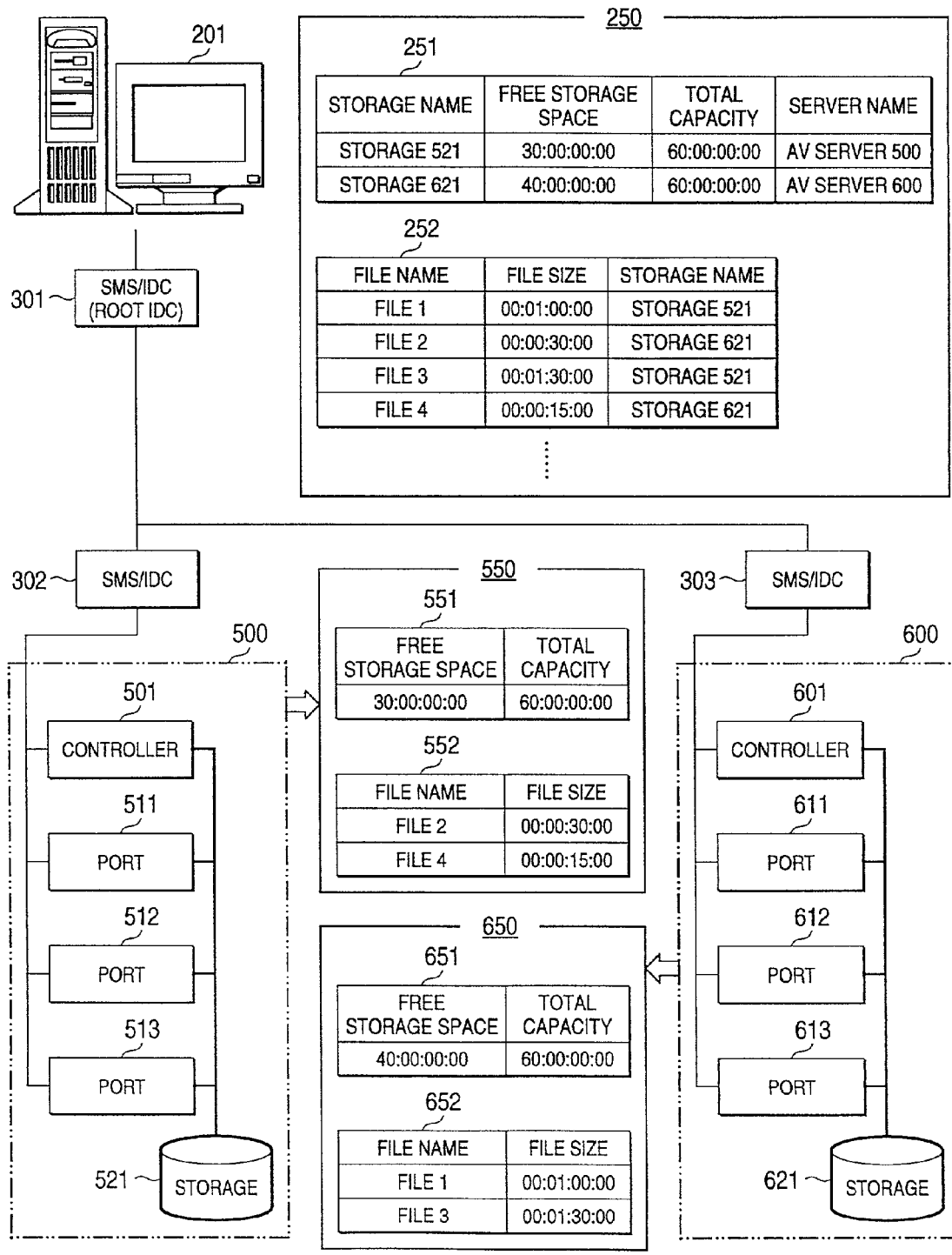
FIG. 4 shows an example of free storage space management information.

FIG. 4 shows the SMS/GW 201, the SMS/IDCs 301-303, the AV servers 500 and 600, etc. of the broadcasting apparatus 1 of FIG. 2 as well as free storage space management information 250 in the SMS/GW 201, free storage space information 550 in the AV server 500, and free storage space information 650 in the AV server 600.

The SMS/GW 201 has the free storage space management information 250 so as to be able to manage the pieces of free storage space information 550 and 650 of the storages 521 and 621 in the respective AV servers 500 and 600 in a unified manner. The pieces of free storage space information 550 and 650, which are provided in the respective AV servers 500 and 600, are managed by the SMS/GW 201 in a unified manner by use of the free storage space management information 250.

The free storage space management information 250 includes free storage space information 251 and file information 252. The free storage space information 251 indicates the free storage space values, total capacities, and server names of the respective storages 521 and 621.

The file information 252 indicates file names, file sizes, and storage names. For example, the file size is expressed by four items that are separated by colons in the form of hour:minute:second:frame.

On the other hand, the free storage space information 550 includes free storage space information 551 and file information 552. Similarly, the free storage space information 650 includes free storage space information 651 and file information 652. The file size in the free storage space information 550 and 650 is usually the same as in the free storage space management information 250.

In the system shown in FIGS. 2 and 4, a recording operation is performed as the higher-rank control terminals 101-103 issue three kinds of commands, that is, an OPEN command, a REC command, and a CLOSE command, to the SMS/GW 201. A free storage space management operation is performed as an internal process for execution of the OPEN command and the CLOSE command among the above three kinds of commands.

(1) OPEN Command

In this system, such an operation as recording or reproduction of a video material is performed by issuing a recording or reproduction control command for an object called a stream. A stream is generated by an OPEN command that is issued from the higher-rank control terminal 101-103. An operation that is performed in response to an OPEN command, which is issued when a video signal is to be recorded, consists of three elements, that is, equipment selection, recording area securing, and stream generation.

Since an OPEN command is issued at the preparatory stage of a recording operation, an error occurring at this time point does not cause a fatal trouble such as a broadcast accident. Errors that may occur at this state are insufficient storage space, an insufficient number of ports, etc. Even at the occurrence of such an error, the operation can be continued by issuing an OPEN command again after deleting an unnecessary material or releasing a port.

An Open command is issued from the higher-rank control terminals 101-103 to the SMS/GW 201 according to the following format, for example:

OPEN SN=n MD=REC PATH=file name DUR=hh:mm:ss:ff

In the above format, SN means an ID for command identification. The higher-rank control terminals 101-103 add SN to each command to allow recognition of completion of execution of each command when a plurality of commands are issued.

Item MD indicates the mode of the OPEN command. In the case of an OPEN command for recording, REC is designated as MD (PLAY is designated in the case of an OPEN command for reproduction).

Item PATH is the file name of a material whose video signal is to be recorded.

Item DUR (for duration) means the size of an area to be secured for recording and is specified in the form of hour:minute:second:frame.

Figure 5:
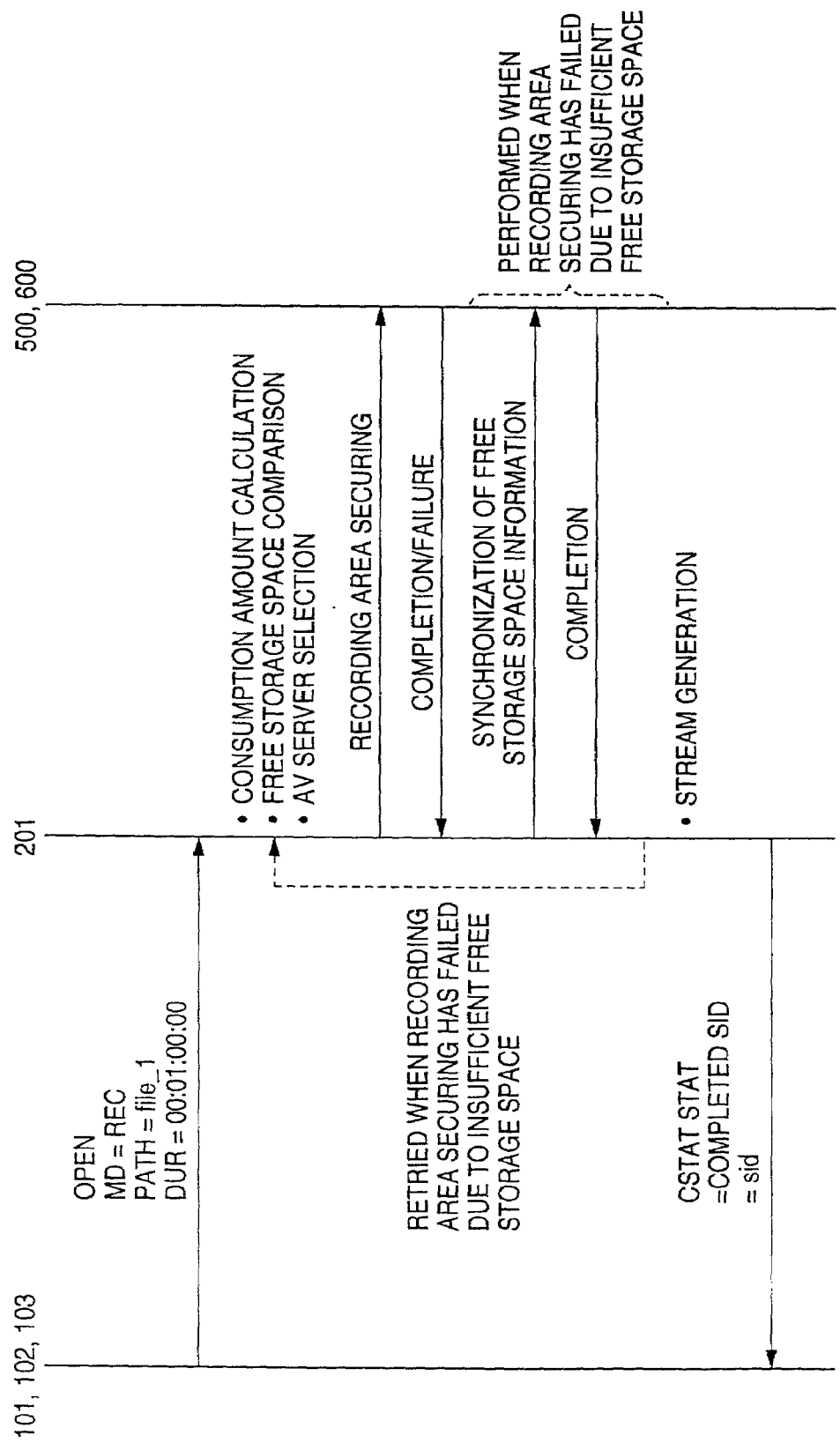
FIG. 5 shows an example sequence of a process corresponding to an OPEN command.

An OPEN operation is performed according to a flow shown in FIG. 5.

FIG. 5 shows an example sequence of a process corresponding to an OPEN command that is executed among the higher-rank control terminals 101-103, the SMS/GW 201, and the AV servers 500 and 600.

When an OPEN command is issued from one of the higher-rank control terminals 101-103 to the SMS/GW 201, calculation of a storage space consumption amount, free storage space comparison, and AV server selection are performed. The SMS/GW 201 secures a recording area in an AV server. In response, the AV server informs the SMS/GW 201 whether recording area securing has completed or failed.

If the recording area securing has failed due to insufficient free storage space, synchronization of pieces of free storage space information is performed and the AV server informs the SMS/GW 201 of completion of the synchronization. When the recording area securing has failed due to insufficient free storage space, an attempt of recording area securing is performed again.

Equipment Selection

Figure 6:
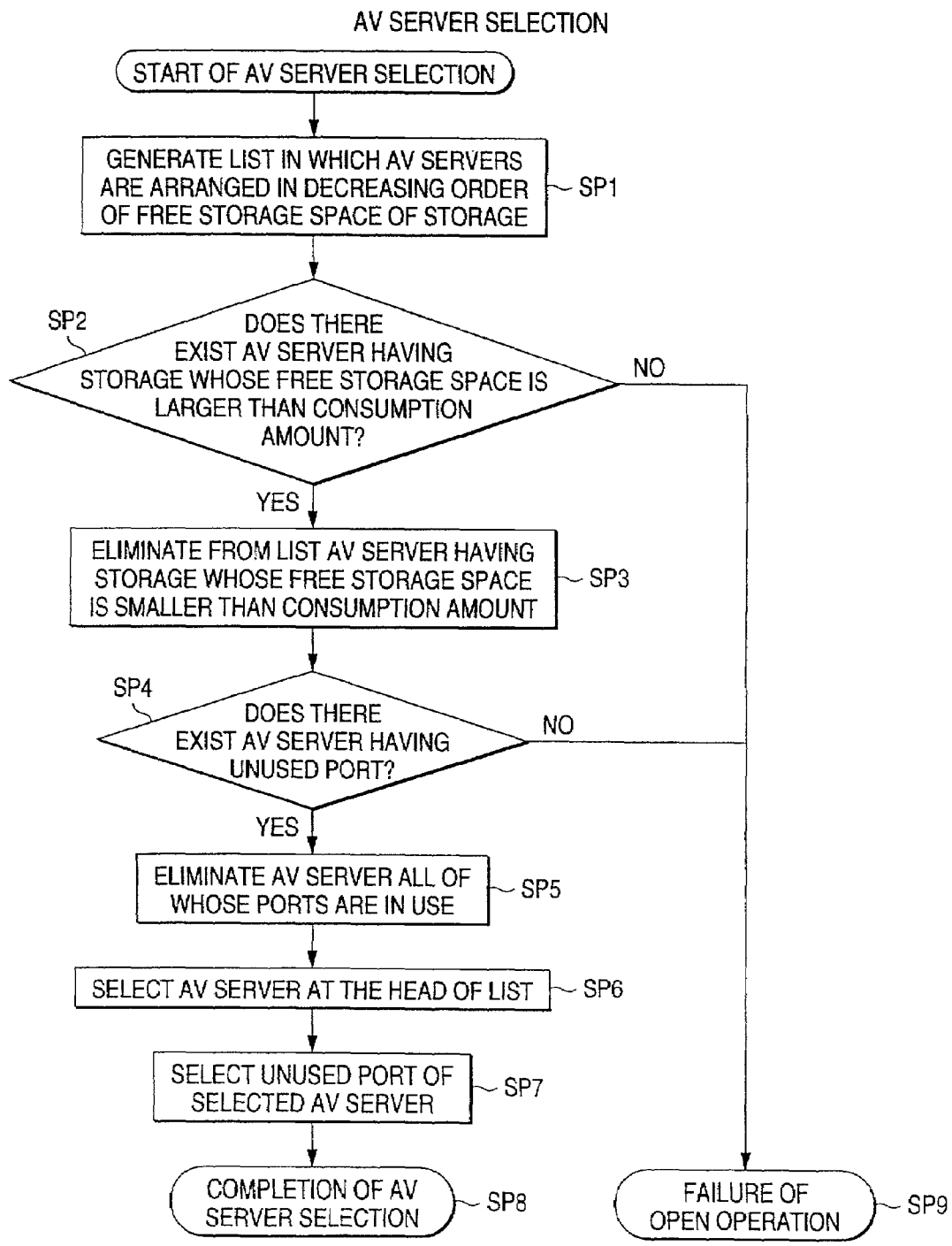
FIG. 6 shows a process of AV server selection.

FIG. 6 shows a process of equipment selection, that is, a process that the control apparatus 10 selects the AV server 500 or 600 or another AV server.

When AV server selection is started, at step SP1 a list in which the AV servers are arranged in decreasing order of the free storage space of the storage is generated.

In a case where the control apparatus 10 shown in FIG. 2 is to calculate a storage space consumption amount, the SMS/GW 201 calculates a storage space consumption amount of a storage by using the DUR value that was added to the OPEN command by the higher-rank control terminal 101, 102, or 103 and indicates "the size of a storage area to be secured for recording." The calculated storage space consumption amount will be used in free storage space comparison and storage selection that follow.

At step SP2 in FIG. 6, it is judged whether there exists an AV server having a storage whose free storage space is larger than the storage space consumption amount. If no such AV server exists, the OPEN operation results in a failure due to insufficient free storage space values of the storages (step At step SP2, the SMS/GW 201 compares the storage space consumption amount that was calculated based on the DUR value with the free storage space values of all the AV servers. At this time, the SMS/GW 201 performs the free storage space comparison by using the free storage space information 251 of the free storage space management information 250 (see FIG. 4). If there is no AV server having a storage whose free storage space is larger than the calculated storage space consumption amount, the OPEN operation results in a failure due to insufficient free storage space as mentioned above (step SP9).

If there exists an AV server having a storage whose free storage space is larger than the calculated storage space consumption amount, at step SP3 an AV server, if any, having a storage whose free storage space is smaller than the storage space consumption amount is eliminated from the list.

At step SP4, it is judged whether there exists an AV server having an unused port. If there exists no such AV server, the OPEN operation results in a failure (step SP9).

If there exists such an AV server, at step SP5 an AV server, if any, all of whose ports are in use is eliminated from the list.

At step SP6, the SMS/GW 201 selects the AV server located at the head of the list.

At SP7, an unused port of the selected AV server is selected. At step SP8, the AV server selection process is finished.

Figure 7:
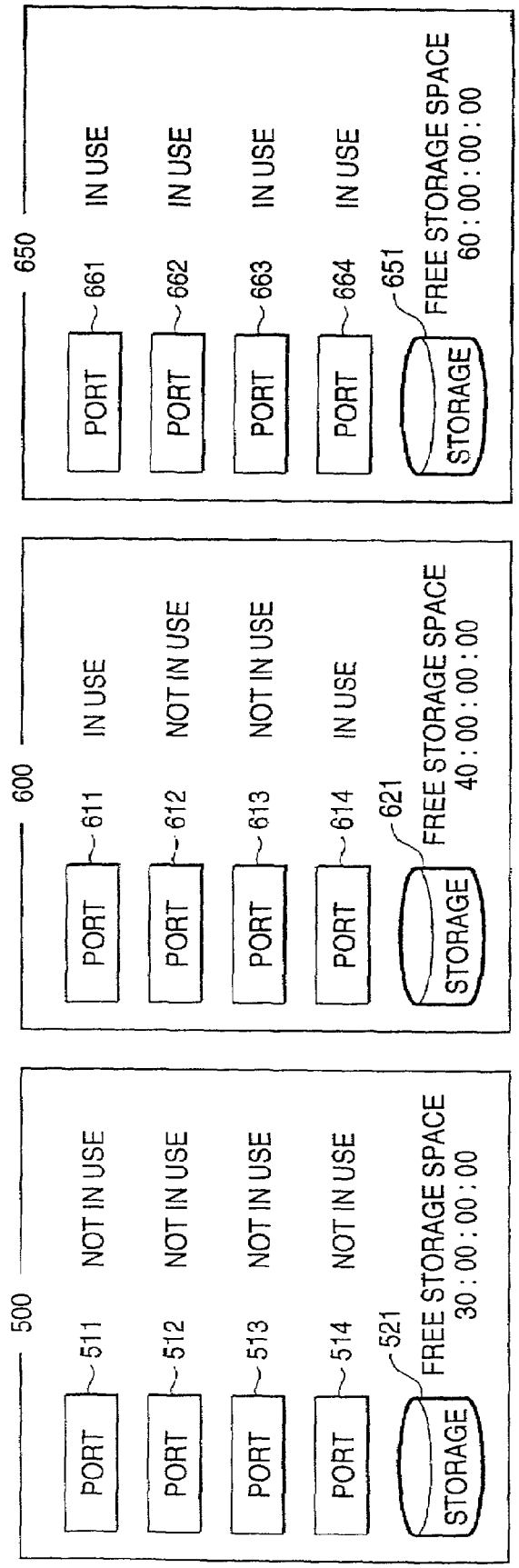
FIG. 7 shows an example of AV server selection.

FIG. 7 shows an example in which one AV server is selected from among three AV servers, that is, the AV servers 500 and 600 shown in FIGS. 2 and 4 and an AV server 650. The AV server 650, which is not shown in FIGS. 2 and 4 to simplify these figures, is connected to the SMS/IDC 304 shown in FIG. 2, for example.

The example of AV server selection shown in FIG. 7 is of a case in which the SMS/GW 201 shown in FIG. 2 receives an OPEN command (DUR=10:00:00:00) from one of the higher-rank control terminals 101-103.

In this example, the free storage space of the storage 521 of the AV server 500 is 30:00:00:00, the free storage space of the storage 621 of the AV server 600 is 40:00:00:00, and the free storage space of the storage 651 of the AV server 650 is 60:00:00:00.

The SMS/GW 201 selects the AV server 600 based on the free storage space values of the AV servers 500, 600 and the port use statuses, and 650 according to the algorithm of FIG. 6. All the ports 511-514 of the AV server 500 are not in use. Whereas the ports 611 and 614 of the AV server 600 are in use, its ports 612 and 613 are not in use. All the ports 661-664 of the AV server 650 are in use. Therefore, checking the free storage space values of the storages 521, 621, and 651 and the use statuses of the ports 511-514, 611-614, and 661-664 in the above-described manner, the SMS/GW 201 selects the AV server 600. Among the ports 661-664 of the AV server 600, the port 612 or 613 is selected.

As described above, the most appropriate storage is selected from among candidates that have passed a check of free storage space comparison or the like. In the example of FIG. 7, the storage 621 of the AV server 600 is selected. As described above, the priority of selection is determined based on the free storage space values of the storages and the port use statuses. An AV server having a usable port and a storage with the largest free storage space is selected.

Recording Area Securing

When AV server selection (equipment selection) is performed in the above-described manner, the SMS/GW 201 performs recording area securing on the selected AV server which is the AV server 600 in the example of FIG. 7. The size of a recording area to be secured is set equal to the storage space consumption amount that was calculated at the time of the equipment selection.

When the recording area securing has been performed normally, stream generation is performed. Usually, the recording area securing does not fail because as shown in FIG. 4 the free storage space information 251 managed by the SMS/GW 201 coincides with the pieces of free storage space information 551 and 651 in the respective AV servers 500 and 600 which are the apparatuses to be controlled. However, if discrepancy occurs between the free storage space information 251 in the SMS/GW 201 and the pieces of free storage space information 551 and 651 in the respective AV servers 500 and 600 for a certain reason such as a failure in a storage, the recording area securing may fail due to insufficient free storage space.

If the recording area securing has failed due to insufficient free storage space, the SMS/GW 201 judges that discrepancy (non-coincidence) has occurred in free storage space information between the SMS/GW 201 and the selected Av server, and performs free storage space synchronization.

Figure 8:
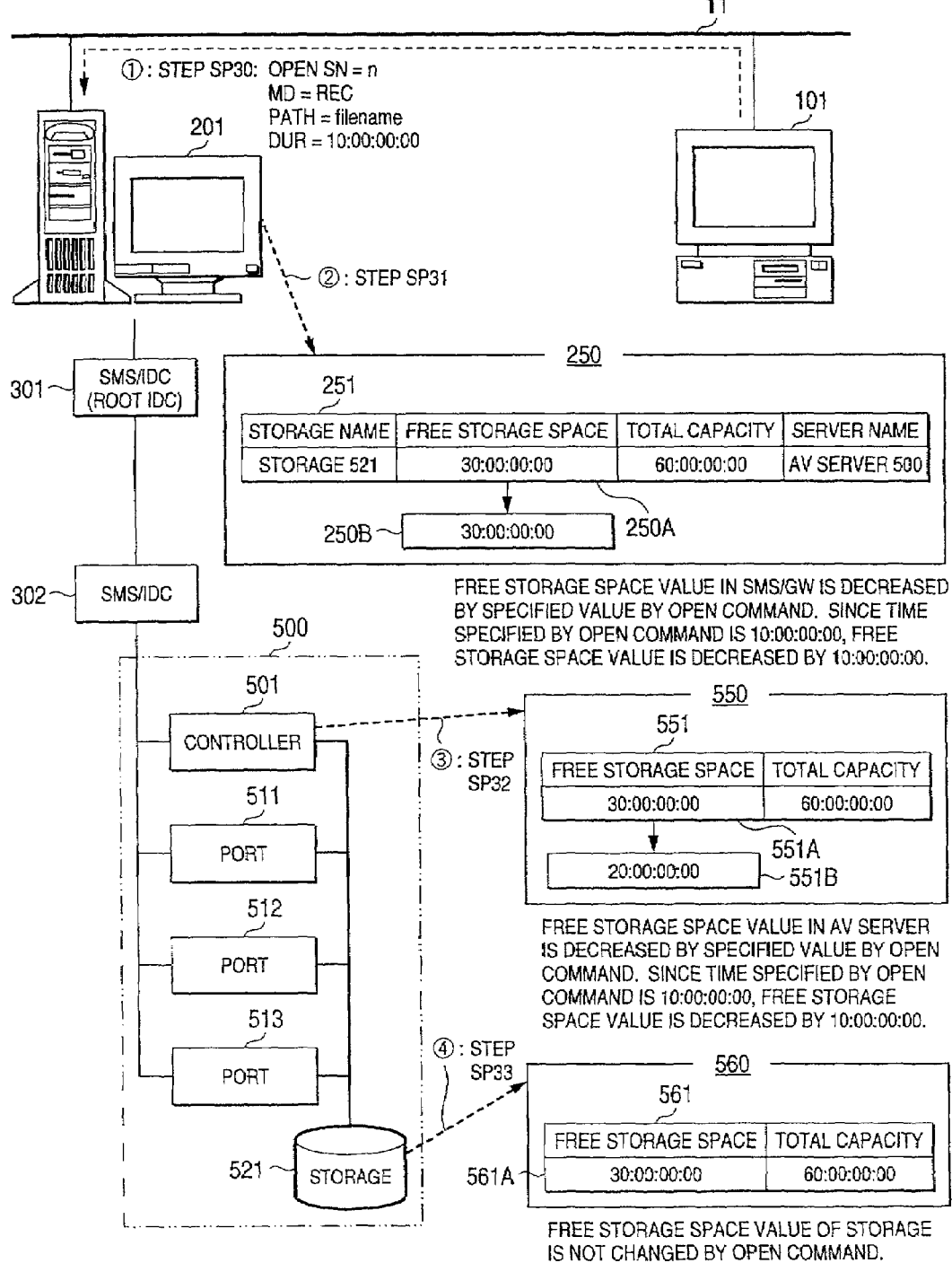
FIG. 8 shows an example of recording area securing.
Figure 9:
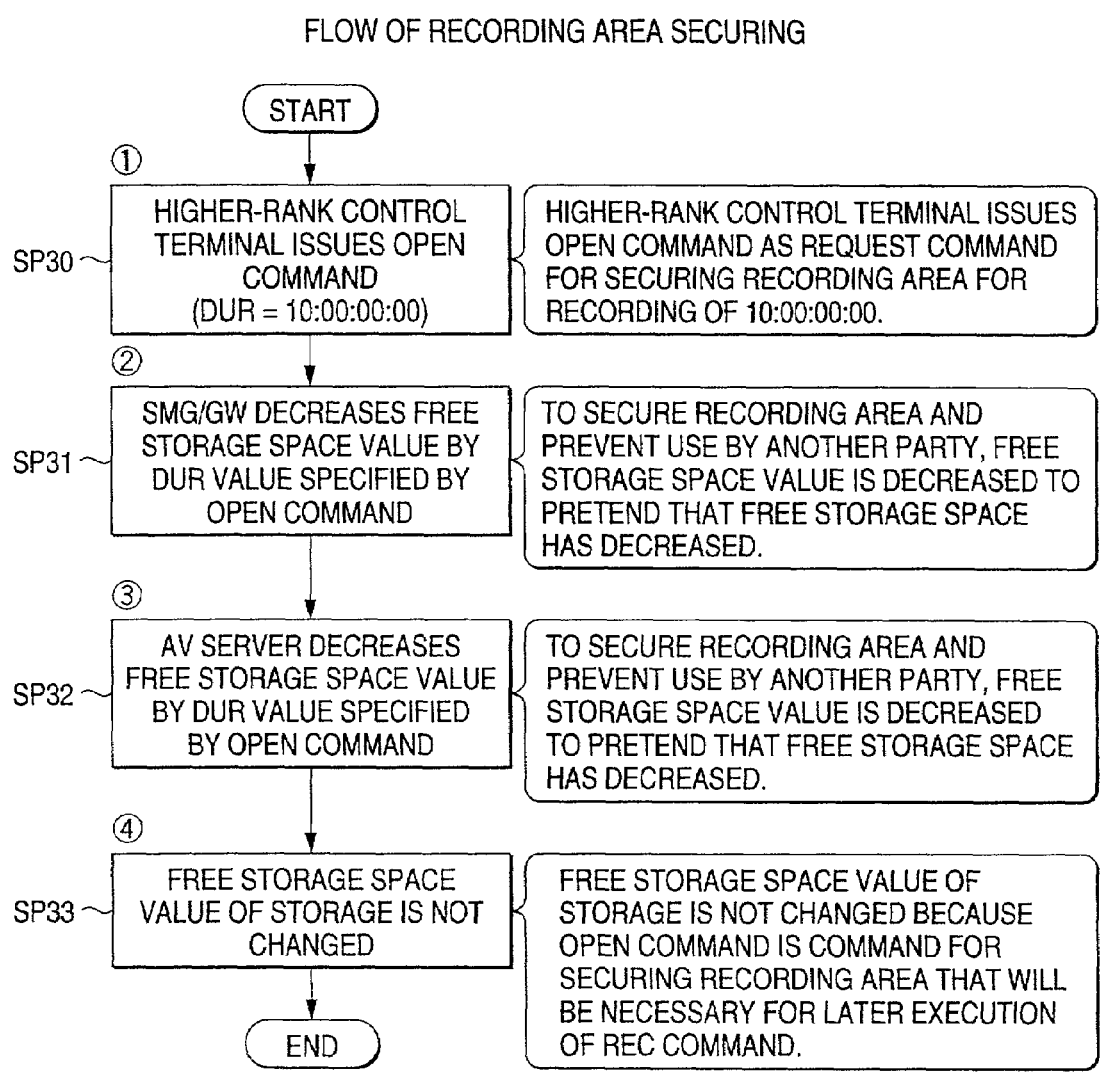
FIG. 9 shows a flow of recording area securing.

FIGS. 8 and 9 show an example of recording area securing.

As shown in FIG. 8, the higher-rank control terminal 101, for example, issues an OPEN command to the SMS/GW 201 at step SP30 in FIG. 9. In this example, DUR=10:00:00:00 (i.e., 10 hours). That is, the higher-rank control terminal 101 issues an OPEN command as a request command for securing a recording area for recording of 10 hours.

At step SP31 in FIG. 9, the SMS/GW 201 decreases the free storage space value by the DUR value (i.e., 10 hours) that is specified by the OPEN command. In the example of FIG. 8, in the free storage space information 251 of the free storage space management information 250, the free storage space value is changed from 30:00:00:00 to 20:00:00:00. That is, the free storage space value is decreased by an amount corresponding to 10 hours.

On the other hand, also in the free storage space information 551 of the free storage space information 550 of the AV server 500, the free storage space value is changed from 30:00:00:00 to 20:00:00:00. In this manner, to secure a recording area tentatively and prevent use by another party (an external control apparatus), the free storage space value is decreased to pretend that the free storage space has decreased. At step SP33, in the free storage space information 560 of the storage 521 of the AV server 500, the actual free storage space remains 30:00:00:00; the free storage space value of the storage 521 is not changed by the OPEN command (step SP33).

At steps SP31 and SP32 in FIG. 9, to secure a recording area tentatively in the storage 521 and prevent its use by another party, the free storage space value of the free storage space information 551 is decreased to pretend that the free storage space has decreased.

In contrast, at step S33, the free storage space value of the storage 521 is not changed because the OPEN command is a command for securing a recording area that will be necessary when a recording command (REC command) is issued later.

As a result, as shown in FIG. 8, whereas a free storage space value 250B of the free storage space information 251 and a free storage space value 551B of the free storage space information 551 are synchronized with each other, that is, they are equal to 20:00:00:00, a free storage space value 561A of the free storage space information 561 is kept at 30:00:00:00.

Free Storage Space Synchronization

When the recording area securing has failed due to insufficient free storage space, for example, the SMS/GW 201 performs free storage space information synchronization.

When the free storage space information synchronization is performed, the free storage space information managed by the SMS/GW 201 and that managed by the AV servers are made equal to each other and the discrepancy is resolved.

Retry of Recording Area Securing

Even if the free storage space synchronization is performed, the recording area securing remains in failure. The SMS/GW 201 retries recording area securing to continue the OPEN operation.

Equipment Re-Selection

A recording area may not be secured in the first-selected AV server due to insufficient free storage space. In view of this, equipment where a storage area is to be secured is selected again. If there exists another AV server having sufficient free storage space, discrepancy between the free storage space information managed by the SMS/GW 201 and that managed by that AV server should be resolved by the free storage space information synchronization. Therefore, an AV server having sufficient storage space is selected by the equipment re-selection (see FIG. 11).

Recording Area Securing

The operation of recording area securing of this time is the same as that of the first time. If the recording area securing is performed normally this time, the process goes to stream generation. If the recording area securing fails this time due to insufficient free storage space, recording area securing is retried.

Limitation of the Number of Times of Retrying

Although the OPEN operation can be continued by retrying recording area securing, retrying attempts may be performed endlessly in an abnormal case where discrepancy in free storage space information occurs one after another. In view of this, the number of retrying attempts is limited to a certain number. If the number of retrying attempts has reached the limit number, no retrying attempt is performed any more. Instead, the OPEN operation is finished (abnormal termination) with a judgment that an abnormality has occurred in the equipment. In this system, the number of retrying attempts is limited to three.

Figure 10:
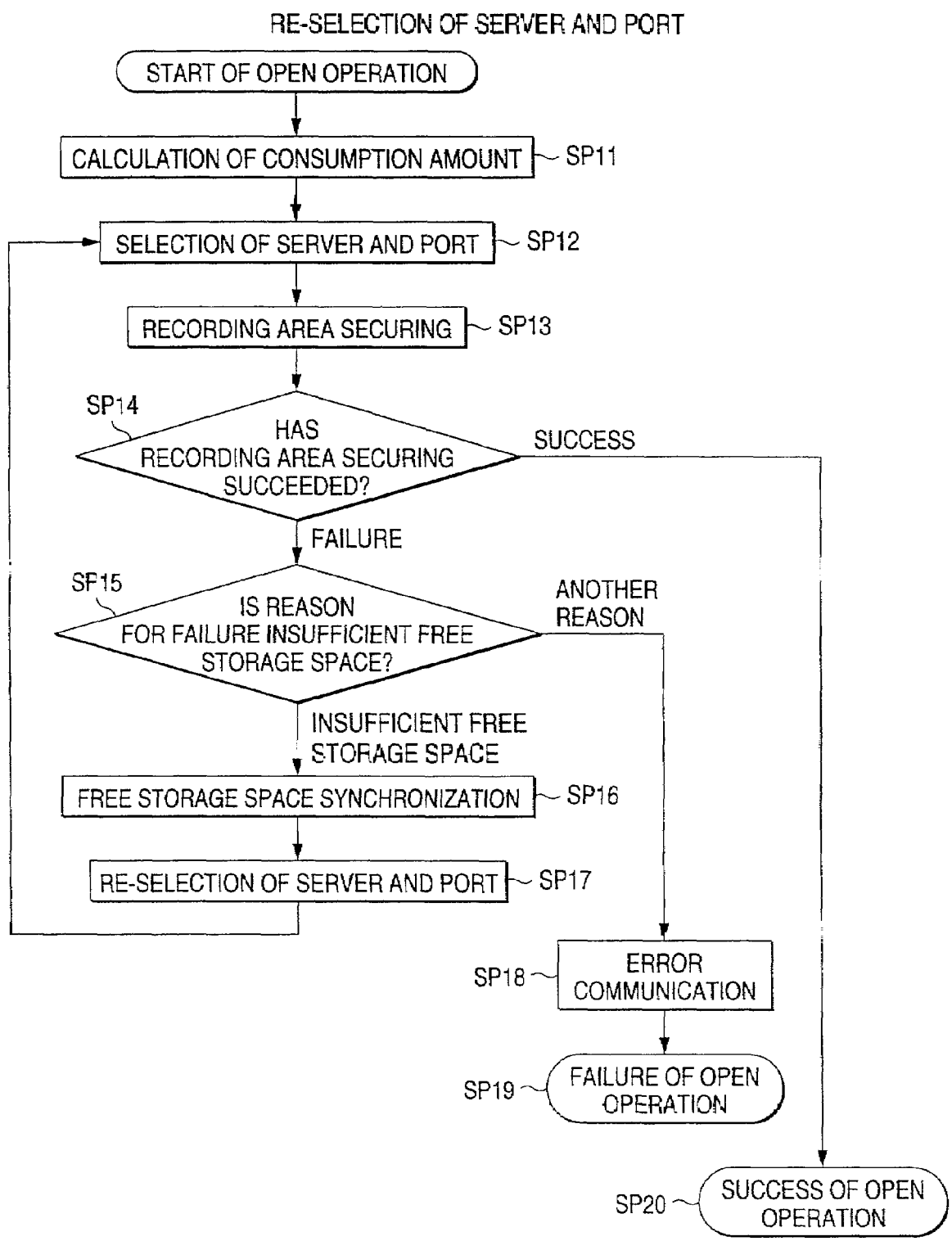
FIG. 10 shows an example process of re-selection of an AV server and a port.

FIG. 10 shows an example process of the above-described retrying of recording area securing (AV server re-selection).

A storage space consumption amount is calculated at step SP11 in FIG. 10. An AV server and a port are selected at step SP12. Recording area securing is performed at step SP13. At step SP14, it is judged whether the recording area securing has succeeded. If the recording area securing has succeeded, it means that the OPEN operation has succeeded (step SP20).

On the other hand, if the recording area securing has failed, it is judged at step SP15 whether the reason for the failure is insufficient free storage space. If it is judged at step SP15 that the reason for the failure is insufficient free storage space, free storage space synchronization is performed at step SP16 and an AV server and a port are selected again at step SP17. Then, the process returns to step SP12. If it is judged at step SP15 that the reason for the failure is another reason, for example, a trouble such as a hardware failure that cannot be repaired by retrying, the process goes to step SP18, where error communication is made. The process is finished at step SP19 with a result that the OPEN operation has failed.

Figure 11:
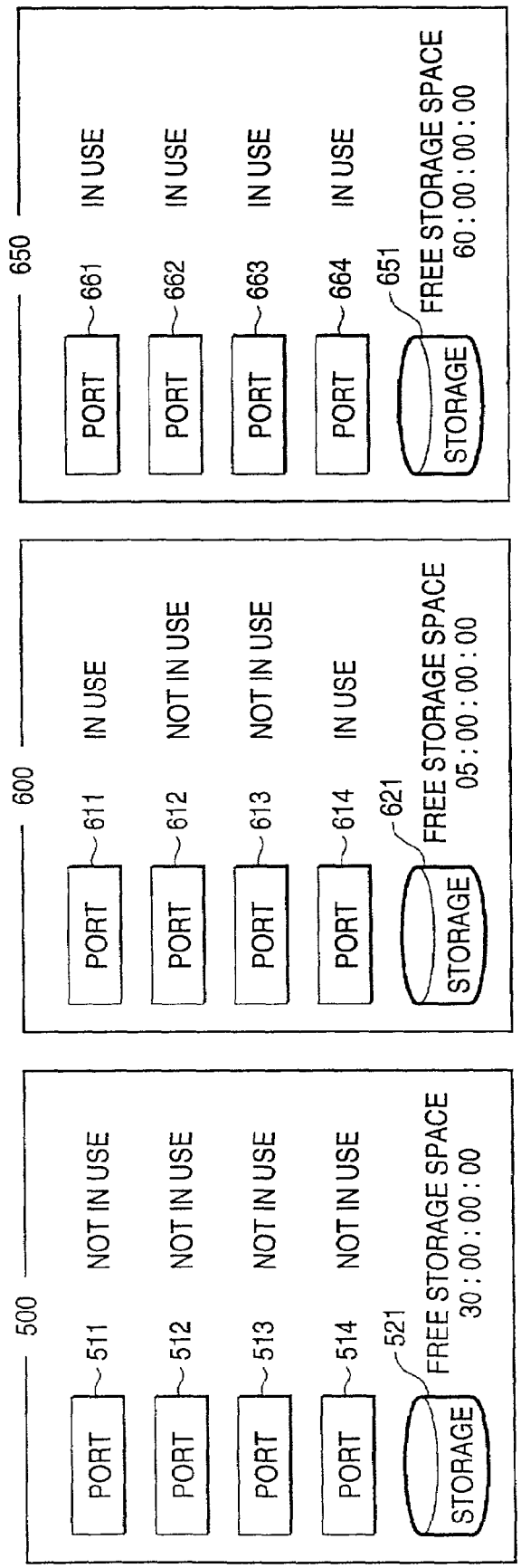
FIG. 11 shows an example of AV server re-selection.

FIG. 11 shows an example of AV server re-selection.

In the example of FIG. 11, the free storage space of the storage 521 of the AV server 500 is 30:00:00:00, the free storage space of the storage 621 of the AV server 600 is 05:00:00:00, and the free storage space of the storage 651 of the AV server 650 is 60:00:00:00.

Since the free storage space information of the AV servers has been updated by the free storage space information synchronization, the free storage space value of the AV server 600 has decreased from 40:00:00:00 to 05:00:00:00 (a decease of an amount corresponding to 35 hours). When receiving an OPEN command (DUR=10:00:00:00) in this state, the SMS/GW 201 selects the AV server 500 based on the free storage space values and the port use statuses according to the algorithm of FIG. 6. One of the unused ports 511-514 of the AV server 500 is selected.

Stream Generation

When the recording area securing has succeeded, the SMS/GW 201 generates a stream. The stream in this system corresponds to a file handle that is used in OSs (operating systems) of computers, for example.

The higher-rank control terminals 101-103 can record a video signal by issuing a REC command for a stream that has been generated by the SMS/GW 201.

The generation of a stream is communicated from the SMS/GW 201 to the higher-rank control terminal 101, 102, or 103 according to the following format:

CSTAT SN=n STAT=COMPLETED SID=sid RSC=resource name

In the above format, CSTAT is an identifier indicating that this is information for communicating a command execution result.

The value that was specified by the higher-rank control terminal 101, 102, or 103 by means of the OPEN command is substituted in SN. The higher-rank control terminal 101, 102, or 103 judges, based on the SN value, what command CSTAT corresponds to.

Item STAT indicates a command execution result. When the execution has completed, STAT is set to COMPLETED. In the case of an error or warning, STAT is set to ERROR or WARNING.

An ID (identifier) indicating the generated stream is substituted in SID. The SID value acquired here is used in a REC command. The SID value is unique to the system.

The names of the AV server and the port that were selected by the equipment selection are substituted in RSC.

(2) REC Command

Next, the REC command (recording command) will be described with reference to FIG. 12.

In this system, a REC command causes an operation on an object called a stream that has been generated by an OPEN operation. A REC command cannot be executed unless an OPEN operation succeeds and a stream object is generated.

Although an error at the stage of execution of a REC command directly causes a broadcast accident, successful execution of a REC command is assured at the time point of generation of a stream object. No error occurs during execution of a REC command except a physical failure in equipment.

The higher-rank control terminals 101-103 issue a REC command to the SMS/GW 201 according to the following format:

REC SN=n SID=sid DUR=hh:mm:ss:ff

A value (sid) indicating a stream ID that was communicated at the time of completion of an OPEN operation is designated as SID.

Item DUR means an actual recording time and is specified in the form of hour:minute:second:frame.

The SMS/GW 201 informs the higher-rank control terminal 101, 102, or 103 of completion of execution of the REC command according to the following format:

CSTST SN=n STAT=COMPLETED

Item STAT indicates a command execution result. When the execution has completed, STAT is set to COMPLETED. In the case of an error or warning, STAT is set to ERROR or Warning.

Figure 12:
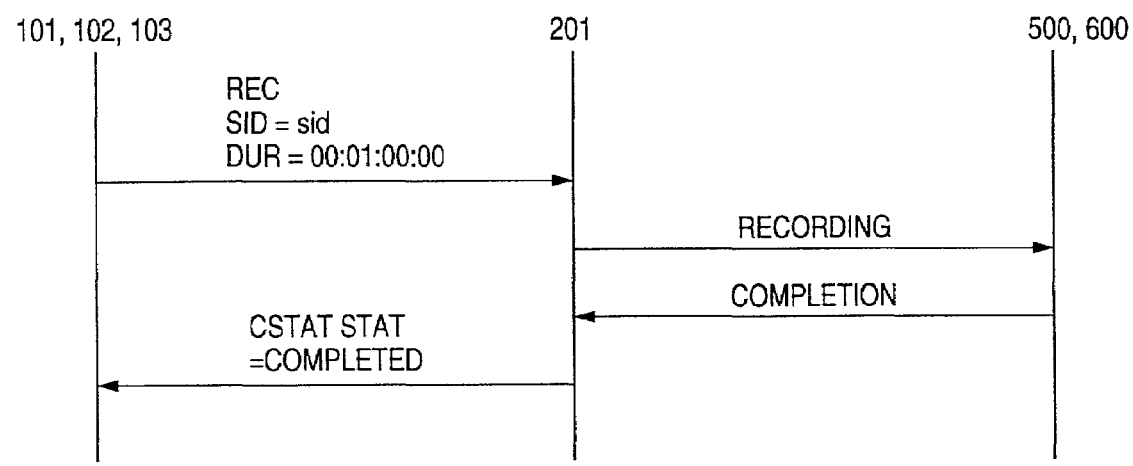
FIG. 12 shows a sequence of a process corresponding to a REC command.

A flow of execution of a REC command is shown in FIG. 12.

(3) CLOSE Command

Next, the CLOSE command will be described with reference to FIG. 13.

In this system, a CLOSE command causes an operation for discarding a stream that has been generated by an OPEN operation.

When receiving a CLOSE command, the SMS/GW 201 performs acquisition of the information of the recorded material, discard of the stream, and release of the port that has been occupied.

The higher-rank control terminals 101-103 issue a CLOSE command to the SMS/GW 201 according to the following format:

CLOS SN=n SID=sid

The SMS/GW 201 informs the higher-rank control terminal 101, 102, or 103 of completion of execution of the CLOSE command according to the following format:

CSTAT SN=n STAT=COMPLETED

Figure 13:
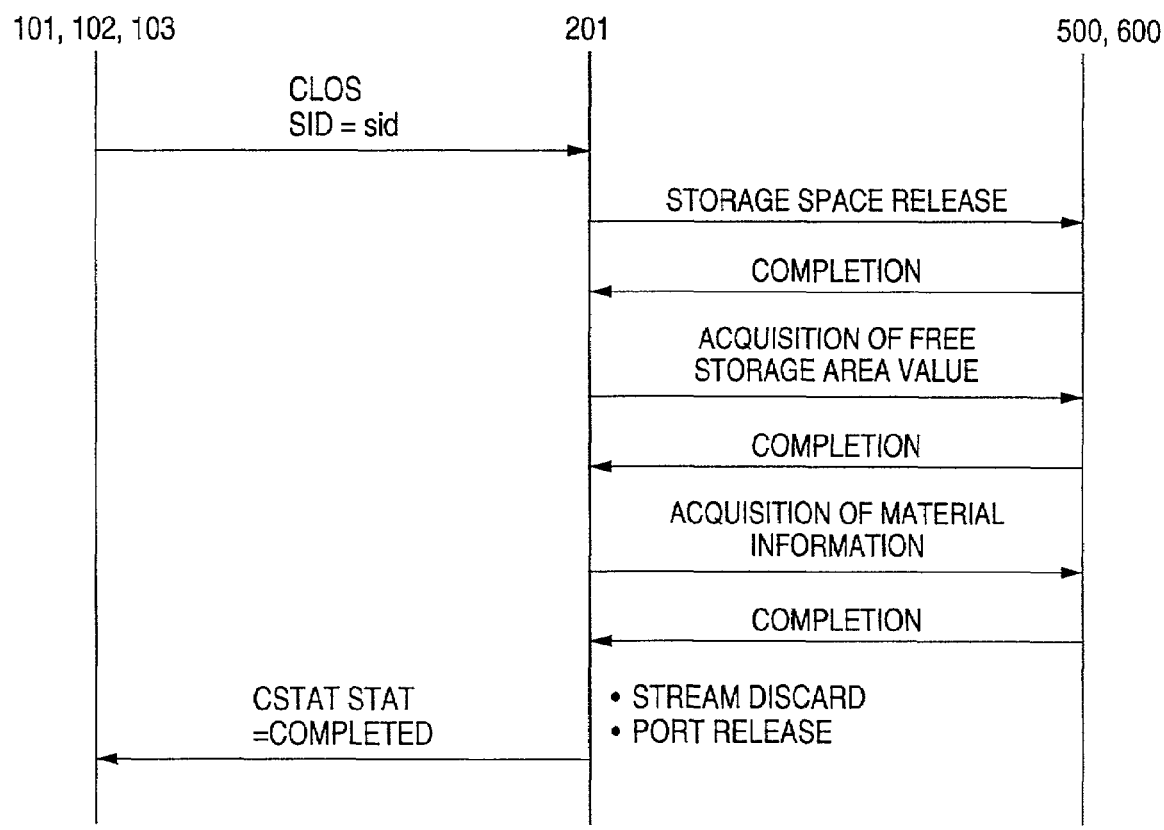
FIG. 13 shows an example sequence of a process corresponding to a CLOSE command.

A flow of execution of a CLOSE command is shown in FIG. 13.

Storage Space Release

As shown in FIG. 13, the SMS/GW 201 instructs the AV server to perform storage space release to have it release part of the recording area that was secured in the OPEN operation. In response, the AV server subtracts the area that was actually consumed by execution of the REC command from the area that was secured in the OPEN operation and releases the remaining area.

Acquisition of Free Storage Space Value and Material Information

As shown in FIG. 13, when receiving a CLOSE command, the SMS/GW 201 acquires the current free storage space value of the AV server and the information of the material that has been generated actually in the AV server. This is because there may occur a case that DUR of an OPEN command issued by the higher-rank control terminal 101, 102, or 103 is different from that of a REC command (however, a relationship (DUR of OPEN command)≧(DUR of REC command) holds).

The SMS/GW 201 updates the free storage space information 251 by using the free storage space value acquired from the AV server, and also updates the file information 252 by using the material information acquired from the AV server.

An example of storage space release will be described below with reference to FIGS. 14 and 15.

Figure 14:
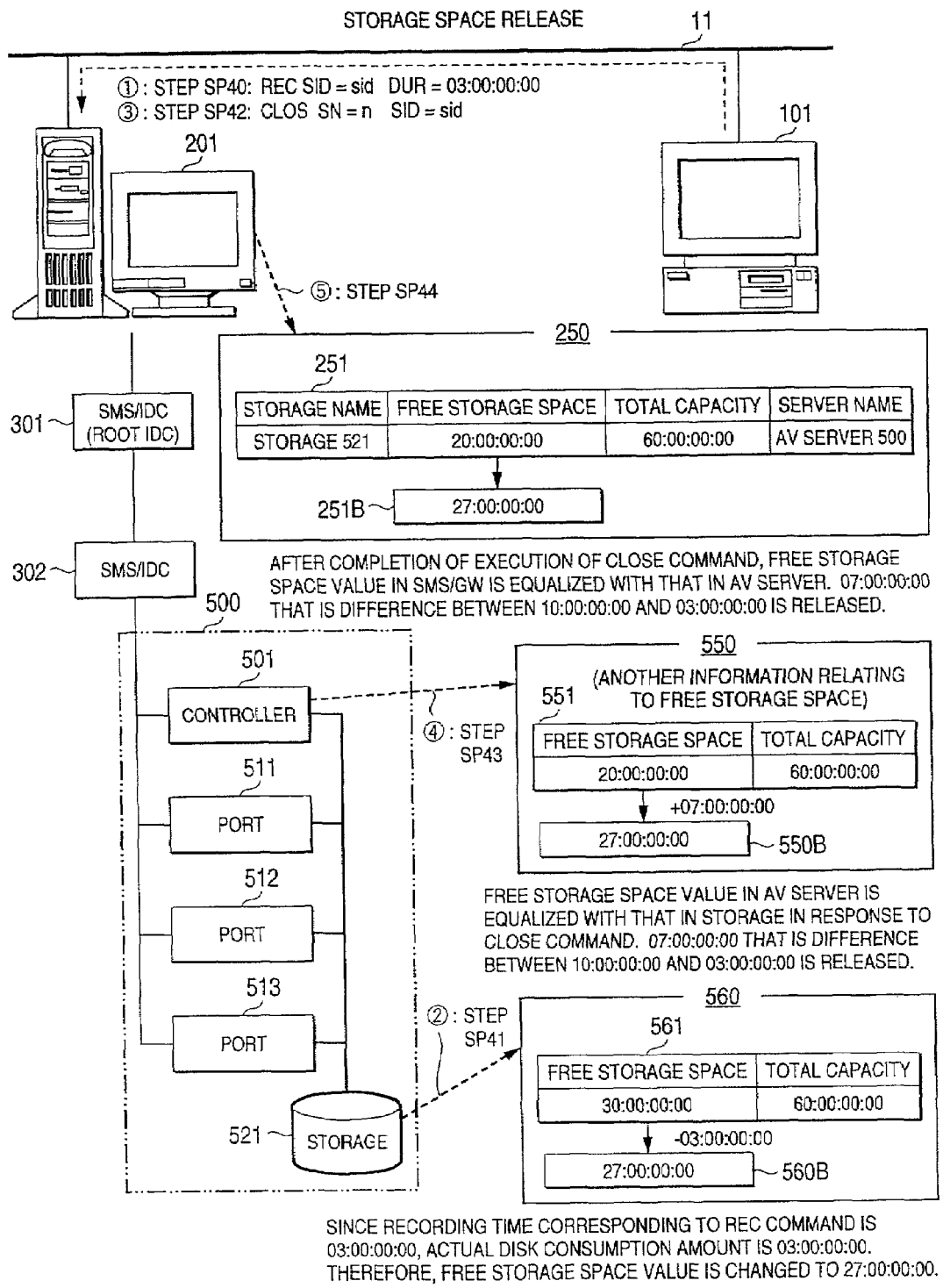
FIG. 14 shows an example of recording area release.
Figure 15:
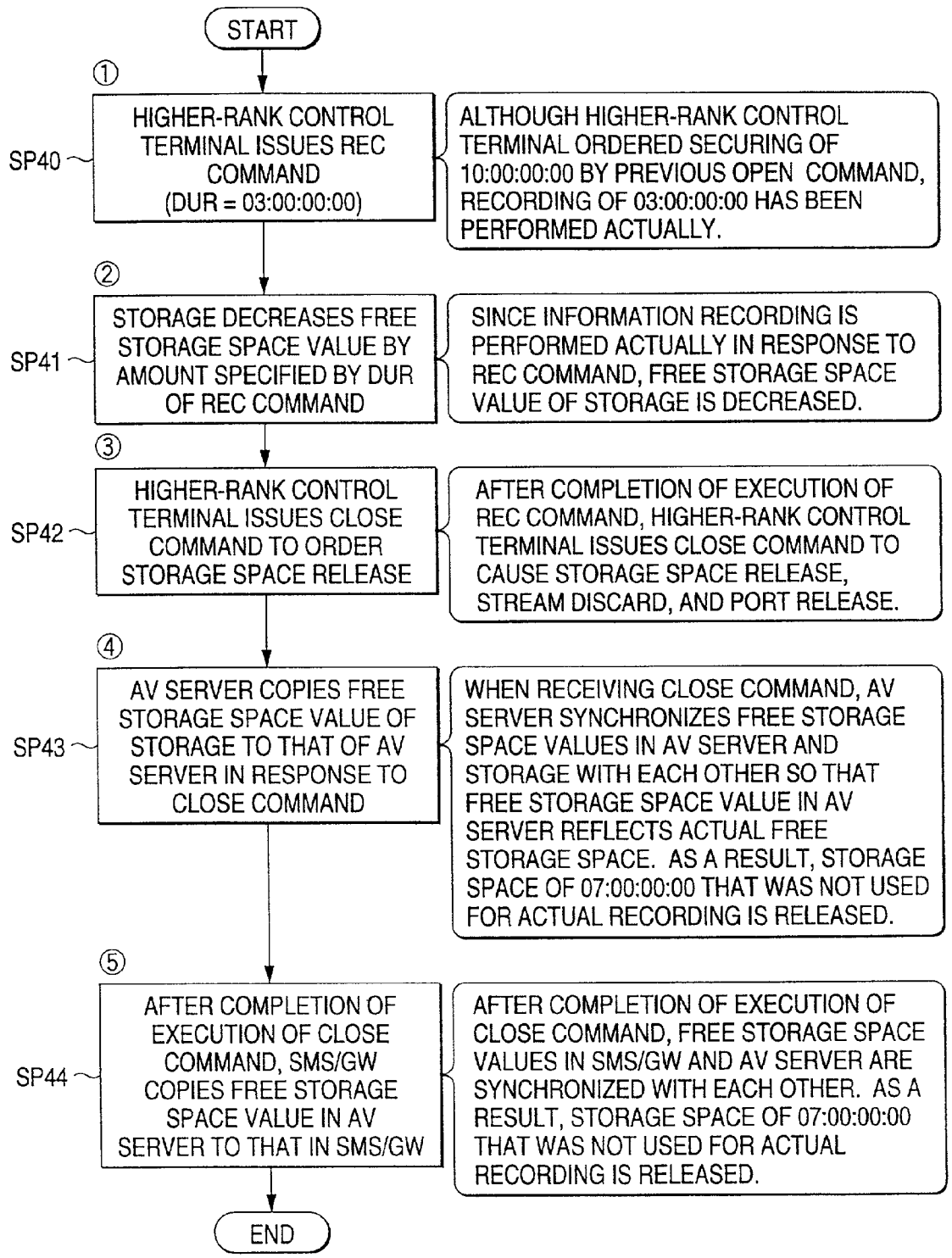
FIG. 15 shows a flow of recording area release.

In the example of FIG. 14, at step SP40 in FIG. 15, the higher-rank control terminal 101 issues a REC command (recording command; DUR=03:00:00:00 (3 hours)) to the SMS/GW 201. This means that although the higher-rank control terminal 101 ordered securing of a recording area of 10:00:00:00 (10 hours) by the previous OPEN command, recording of 03:00:00:00 (3 hours) was performed actually.

At step SP41 in FIG. 15, the free storage space value of the storage 521 (see FIG. 14) is decreased by an amount specified by DUR of the REC command. For example, the free storage space value of the free storage space information 561 of the free storage space information 560 is changed from 30:00:00:00 to 27:00:00:00; that is, a time obtained by subtracting the actual disk storage space consumption amount 03:00:00 is employed as a new free storage space value. Since information recording has been performed actually in response to the REC command, the free storage space value of the storage 521 is decreased.

At step SP42 in FIG. 15, the higher-rank control terminal 101 issues a CLOSE command and thereby orders storage space release. The higher-rank control terminal 101 issues a CLOSE command after completion of execution of the REC command to cause storage space release, stream discard, and port release.

At step SP43, in response to the CLOSE command, the AV server 500 in FIG. 14 copies the free storage space value in the storage 521 to that of the free storage space information 551 in the AV server 500. That is, the free storage space value 20:00:00:00 of the free storage space information 551 of the free storage space information 550 (see FIG. 14) is changed from 20:00:00:00 to 27:00:00:00, whereby storage space of 07:00:00:00 is released that is the difference between 10:00:00:00 and 03:00:00:00.

In this manner, at step SP43 in FIG. 15, upon reception of the CLOSE command the AV server 500 synchronizes the free storage space values in the AV server 500 and the storage 521 with each other so that the free storage space information 551 in the AV server 500 reflects the actual free storage space. That is, a free storage space value 550B of the free storage space information 550 and a free storage space value 560B of the free storage space information 560 are synchronized and equalized with each other. As a result, storage space of 07:00:00:00 that was not used for the recording actually is released.

At step SP44 in FIG. 15, after completion of the execution of the CLOSE command, the SMS/GW 201 copies the free storage space value in the AV server 500 to that in the SMS/GW 201. That is, the SMS/GW 201 synchronizes and equalizes a free storage space value 251B of the free storage space information 251 of the free storage space information 250 in FIG. 14 with the free storage space value 550B of the free storage space information 550 and the free storage space value 560B of the free storage space information 561 of the free storage space information 560 on the AV server 500 side. As a result, storage space of 07:00:00:00 that was not used for the recording actually is released also on the SMS/GW 201 side.

Stream Discard

The stream that was generated in response to the OPEN command is discarded. After the discard of the stream, the higher-rank control terminals 101-103 cannot make a manipulation by using the same SID.

Port Release

The port that was selected in response to the OPEN command and has been occupied thereafter is now released so as to be used by users of the other higher-rank control terminals.

As described above, the embodiment of the invention makes it possible to perform correct free storage space management through free storage space synchronization even when the free storage space decreases in an apparatus to be controlled asynchronously with a control due to a failure in a recording device in a case where plural pieces of equipment are used simultaneously by a plurality of users. When recording area securing has failed due to asynchronous decrease in free storage space, the embodiment makes it possible to continue the control by using the recording means of another usable apparatus to be controlled by retrying recording area securing.

According to the embodiment of the invention, a control apparatus manages, in a unified manner, the free storage space information of a plurality of apparatuses to be controlled. When discrepancy occurs in free storage space information between some of the control apparatus and the apparatuses to be controlled, the discrepancy is resolved by synchronizing the pieces of free storage space information.

Where there exist a plurality of apparatuses to be controlled, when recording area securing in one apparatus to be controlled has failed, recording area securing in another apparatus to be controlled is retried in accordance with a reason for the failure.

The embodiment of the invention can provide a free storage space management method suitable for use in a plurality of terminals such as broadcasting business AV servers and apparatuses in which recording areas may be secured simultaneously by users.

As described above, the invention makes it possible to correctly manage the free storage space of a recording means and to continue a control by selecting another usable recording means even when recording area securing in the free storage space of a recording means has failed.

What is claimed is:

1. A free storage space management apparatus in a broadcasting apparatus, comprising:

recording means for recording information which includes information relating to free storage space of the recording means; and control means for recording information in the recording means and for acquiring the information relating to the free storage space of the recording means, wherein the control means selects the recording means by generating a list in which the recording means are arranged in decreasing order of free storage space, comparing a storage space consumption amount to free storage space values of all the recording means, and determining whether there exists a recording means having an unused port, wherein said control means selects the recording means having an unused port with the most free storage space greater than the storage space consumption amount, wherein the control means generates a stream with a unique identifier upon successfully securing a recording area in the selected recording means having an unused port, and wherein said stream is discarded upon release of said most free storage space and said unique identifier is not used again.

2. The free storage space management apparatus according to claim 1, wherein when a discrepancy occurs between the information relating to the free storage space of the recording means and management information relating to free storage space in the control means, the control means synchronizes the management information relating to free storage space in the control means with the information relating to the free storage space of the recording means.

3. The free storage space management apparatus according to claim 2, wherein the recording means includes a plurality of recording means, and wherein when an operation of securing a recording area in one of the plurality of recording means in response to a command from the control means has resulted in a failure, the control means secures a recording area in another of the plurality of recording means in accordance with a reason for the failure.

4. A free storage space management method in a broadcasting apparatus, comprising the steps of:
   acquiring information relating to free storage space of recording means;
   generating a list in which the recording means are arranged in decreasing order of free storage space;
   comparing a storage space consumption amount to free storage space values of each of the recording means;
   determining whether there exists a recording means having an unused port;
   selecting the recording means having an unused port with the most free storage space greater than the storage space consumption amount;
   generating a stream with a unique identifier upon successfully securing a recording area in the selected recording means; and
   discarding said stream upon release of said most free storage space, wherein said unique identifier is not used again.

5. The free storage space management method according to claim 4, wherein when a discrepancy occurs between the information relating to the free storage space of the recording means and management information relating to free storage space in a control means, the control means synchronizes the management information relating to free storage space.

6. The free storage space management method according to claim 5, wherein the recording means includes a plurality of recording means, and
   wherein when an operation of securing a recording area in one of the plurality of recording means in response to a command from the control means has resulted in a failure, the control means secures a recording area in another of the plurality of recording means in accordance with a reason for the failure.

7. The free storage space management method according to claim 4, wherein a control means temporarily secures a recording area in second information relating to free storage space but does not change a value of the information relating to the free storage space of the recording means.

8. The free storage space management method according to claim 7, wherein when there is a difference between the tentatively secured recording area and a recording area that has been used actually by the control means, the control means synchronizes the second information relating to free storage space with the information relating to the free storage space of the recording means.

* * * * *